United States Patent [19]

Roger

[11] 4,420,011

[45] Dec. 13, 1983

[54] DUAL PISTON SENSING MECHANISM

[76] Inventor: Harry Roger, 124 Banks Ave., Lafayette, La. 70506

[21] Appl. No.: 328,606

[22] Filed: Dec. 8, 1981

[51] Int. Cl.$^3$ .......................................... F16K 31/122
[52] U.S. Cl. ............................. 137/269; 137/625.66; 251/62; 92/62
[58] Field of Search ...................... 251/62, 63.4, 63.5; 137/625.4, 270, 269, 625.66; 92/65, 62

[56] References Cited

U.S. PATENT DOCUMENTS

| | | | |
|---|---|---|---|
| 4,073,466 | 2/1978 | Snyder | 137/625.66 |
| 4,084,613 | 4/1978 | Peters | 137/625.66 |
| 4,217,934 | 8/1980 | Peters | 137/625.66 |

Primary Examiner—Martin P. Schwadron
Assistant Examiner—James R. Shay
Attorney, Agent, or Firm—Guy E. Matthews

[57] ABSTRACT

A pilot valve is disclosed having a piston actuating a valve element shiftable between a first and second positions. The piston is comprised of two concentrically arranged pistons, the larger piston having an internal bore with two sections of staggered diameters and a smaller, correspondingly shaped second piston inserted in the concentric internal bore. A single O-ring on the bottom of the second section of the first piston annularly mounted around the second section of the second piston seals the piston chamber from a fluctuating sensed fluid pressure. The first piston has a longer upper bore section than the second piston. A spacer is placed at the juncture of the first and second sections of second piston so as to enable the first and second piston to act in unison in actuating the valve element. In this mode, the effective surface area of the piston is equal to the diameter of the larger piston or of the O-ring. When the spacer is removed, the second piston is enabled to act independently of the first piston. Therefore, the effective surface area of the piston in this mode is equal to the cross sectional area of the second piston only and the pressure required to influence the position the valve element opposed by a single spring is increased. Thus two discrete ranges are enabled for the pilot valve as herein disclosed determined by the presence or absence of the spacer.

2 Claims, 2 Drawing Figures

DUAL PISTON SENSING MECHANISM

FIELD OF THE INVENTION

The present invention relates generally to a high and low pressure sensor and more particularly, to a pilot valve having a piston mechanism capable of two separate response modes.

BACKGROUND OF THE INVENTION

Pilot valves of the block and bleed type commonly use a pressure balance spool valve which is shiftable, responsive to a change in a controlled sensed pressure to apply or exhaust a control pressure to a motor valve, thereby controlling the latter. Thus the valve element is normally urged to one position by a spring whose force is opposed by the fluid pressure to be controlled acting on a piston to urge the valve element towards a second position. Pressure sensing valves of this type generally incorporate as part of the valve element, or separate from the valve element and engaging the valve element, a piston chamber within a piston chamber exposed to the sensing fluid pressure so that the area of the piston member determines the force at which a specified pressure will overcome the spring force opposing the fluid pressure to urge the valve element towards its second position.

For a specified piston area pressure surface and a specified spring, a pressure sensor pilot valve has a specified range of pressure to which the "trip" pressure may be adjusted. In order to accomodate different values of pressure ranges, pilot valves incorporated the use of number of springs of varying compression force and/or different piston and housing assemblies having varying piston surface areas such as is shown in U.S. Pat. No. 4,258,741 or my co-pending application entitled "Adjustable Pressure Sensing Piston Mechanism", Ser. No. 126,691 filed Mar. 3, 1980. This practice necessitated interchanging these various springs and/or piston and housing assemblies to accomodate a certain specific range of "trip" pressure in order for the sensing pilot valve to function properly.

Further, previous designs required adjustment mechanisms involving a large number of parts and the use of multiple seals such as O-rings within the piston apparatus.

SUMMARY OF THE INVENTION

The present invention is directed towards a piston mechanism for use with a valve having a movable valve element therein. The piston mechanism comprises first and second piston members which may separated by a spacer. The effective surface area of the piston may be altered by removing the spacer so that only one of the piston members is responsive to fluctuating pilot pressure. By altering the effective surface area of the piston, the operating range of the pilot valve may be modified. Further, the present invention rquires a single O-ring seal or the like to hermetically isolate the fluctuating sensed fluid from the interior of the valve through the pilot fluid passes. Thus, the present invention discloses a piston mechanism which requires fewer components.

Therefore, it is a principal feature and object of the present invention to provide a pilot valve whereby the operating range of the valve may be altered by removing a spacer between two components of the piston, so as to alter the effective surface of the piston exposed to the fluctuated pilot pressure.

It is yet another feature and advantage of this invention to reduce the number of seals used within the valve to separate the pilot and sensed fluids.

Therefore, these and other objects and advantages of the invention will be more clearly evident upon a careful examination the following detailed description, claims, and drawings and wherein:

DETAILED DESCRIPTION OF THE INVENTION

Figure 1:
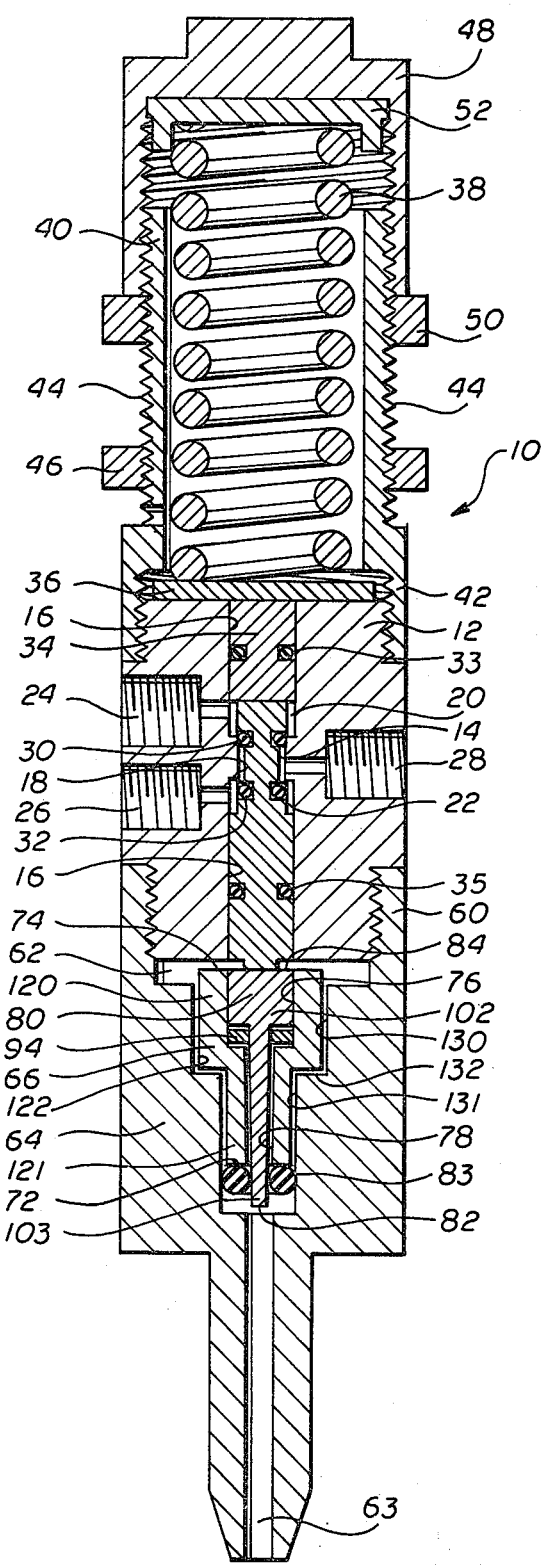
FIG. 1 is a vertical sectional view of a high low pilot valve incorporating the present invention in one functional mode.

Turning now to the drawings and more specifically FIG. 1, a high-low pressure sensor pilot valve is shown generally illustrated by the numeral 10. The valve comprises a valve body 12 having an elongated bore 16 therethrough in which is positioned a valve element 14 operable to shift (vertically in the drawing) between two positions. The valve body 12 includes an intermediate bore 18 defining an upper annular surface 20 and lower annular surface 22, which annular surfaces are engaged by respective first and second O-rings 30 and 32 in order to provide a seal between the valve element 14 and intermediate bore 18 when the valve element is in either of its two positions. The valve body 12 includes a first inlet port 24 communicating with the elongated bore 16 at a position above the intermediate bore 18, a second inlet port 26 communicating with the elongated bore at a position below the intermediate bore and an outlet port 28 communicating with the elongated bore at the location of the intermediate bore.

As is best shown in FIG. 1, when the valve element 14 is in its "lower" position, the first or upper O-ring 30 engages the upper annular surface 20 to affect a seal therebetween, precluding communication between the first inlet port 24 and the outlet port 28. Similarly, when the valve element 14 is in its upper position, the second, or lower O-ring 32 engages the lower annular surface 22 to affect a seal therebetween, precluding the communication between the second inlet port 26 and the outlet port 28. In each of the above instances, when the communication is precluded between an inlet port and the outlet port, the valve element 14 is so positioned to permit communication between the other inlet port and the outlet port. Thus, when the valve element 14 is in its upper position it "blocks" communication between the second inlet port 26 and the outlet port 28 as it "bleeds" any residual fluid pressure from the outlet port to the first inlet port. Similarly, with the valve element 14 in its lower position, it blocks communication between the first inlet port and the outlet port while it permits communication between the second inlet port 26 and outlet port 28 in order to bleed any residual fluid pressure therein.

Fluid pressure within the area of the intermediate bore 18 is precluded from escaping from either end of the elongated bore 16 by operation of respective upper and lower O-rings 33 and 35. It can be appreciated that it would be impossible to install a valve element 14 of the particular design shown in the drawings within the elongated bore 16 and the intermediate bore 18 of the valve body 12. Therefore, the valve element 14 includes a separate elongated member 34 which is installed from above as the main valve element portion is installed from below. This elongated member 34 engages a pressure plate 36 positioned immediately above the valve body 12, which pressure plate in turn engages a compression spring 38 for providing a force urging the elongated member 34 and valve element 14 downwardly towards the second position shown in FIG. 1.

The spring 38 is retained in compression by a spring housing 40 which is threadedly engaged to the valve body at 42. The spring housing 40 includes external threads 44 threadedly engaging an adjusting screw 48 in the upper end thereof for adjusting the compression force of the spring 38 against the pressure plate 36. The spring 38 is retained in axial alignment with the presure plate 36 and adjusting screw 48 by an internal spring guide 52 position within the adjusting screw 48. Additionally, panel jam nut 46 is provided to retain the valve 10 securely in positioned within an operation panel, and adjusting screw jam nut 50 is provided to retain the adjusting screw 48 once positioned, to prevent same from loosing its pressure range adjustment in a vibration oriented environment.

The present invention is directed towards a piston mechanism for use with a valve housing having a movable valve element therein, as in the high low pressure sensor pilot valve described hereinabove. The piston mechanism comprises a piston housing 60, including an internal piston chamber 62 and a sensing port 63 communicating with the piston chamber, as shown in FIG. 1. The piston chamber defines a first portion 130 of larger diameter than a second portion 131. The juncture of the first and second portions of the piston chamber 62 defines a shoulder 132.

A piston means 64 is positioned within the piston chamber 62 and comprises a first piston 66 and a second piston 80 to be described hereinbelow. The first piston 66 includes a first surface 72 and a second surface 74 opposite therefrom, which first surface is the effective "pressure surface" of the first piston 66. The first piston 66 includes a first internal bore 76 concentric with the outer cylindrical surface thereof, and also includes a second concentric bore 78. The first piston 66 defines a first portion 120 and second portion 121, said first portion being of larger diameter than said second portion. The juncture of the first and second portions of the first piston 66 defines a shoulder 122 which engages the shoulder 132 formed within the piston chamber 62 so as to limit downward travel of the piston means 64. The second piston 80 includes a first portion 102 defining a surface 84 and second portion 103 which defines a surface 82 at the opposite end thereof. An annular seal 83, such as a Teflon O-ring or the like, may be positioned as shown in FIG. 1 in contact with surface 72 and piston chamber 62 so as to provide a seal between port 63 and the ports 24, 26 and 28.

The piston means 64 also includes an annular spacer 94 positioned between the mating annular surfaces of the respective first and second pistons 66 and 80, for enabling the second piston to engage and actuate the valve element 14 in response to sufficient fluid pressure applied to the sensing port 63 as will described hereinbelow. It will be noted that the length of the first section 102 is less than that of the bore section 76. In the preferred embodiment of the invention, the spacer 94 is equal in thickness to the difference in these two lengths.

Briefly, the operation of the high low pressure sensor pilot valve is as follows: if the pilot valve is to act as a high pressure sensor and is to block flow to a controlled valve responsive to the occurrence of a high controlled pressure applied to the sensing port 63, control fluid is piped to the second inlet port 26 and the first inlet port 24 is open to the atmosphere or equivalent. However, when the pilot valve is to act as a low pressure sensor and is to block flow to the controlled valve responsive to the occurrence of a low pressure in the sensing port 63, the control fluid is piped to the first inlet port 24 and the second inlet port 26 is open to the atmosphere or equivalent. Thus, the pilot will block flow to the controlled valve while bleeding the pressure from the latter responsive to the occurrence of a predetermined high or low pressure depending on the piping to inlet ports 24 and 26.

In the event it is desired to alter the ranges of fluid pressure that will shift the valve element 14 from its first position to its second position against the opposition of spring 38, the spacer 94 may be positioned in contact between the first and second pistons 66 and 80. As may be understood from the study of FIG. 1, fluid pressure at sensing port 63 is exposed to the second piston surface 84 and seal 83. As pressure through port 63 increases, the first piston 66, having a larger surface area 72 is urged upwardly to engage the bottom end surface of valve body 12. The presence of the spacer 94 enables the first and second pistons 66 and 80 to act as an integral unit against the valve element 14 in response to the sensed fluid pressure. In this mode, the effective piston surface area of the piston means 64 is equal to that defined by the outer diameter of the O-ring 83.

Figure 2:
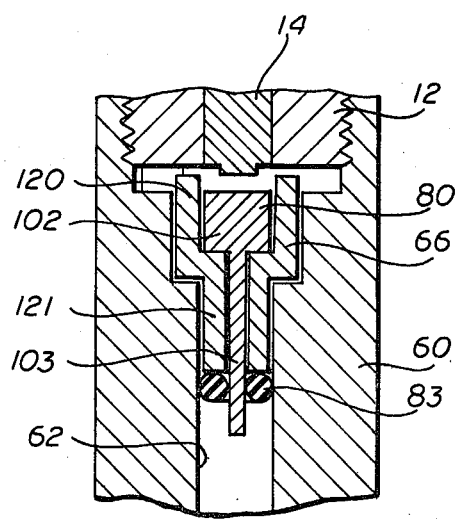
FIG. 2 is a partial vertical sectional view of the present invention shown in a second functional mode.

A second mode of the piston means 64 within the piston chamber 62 is shown in FIG. 2. The spacer 94 has been removed between the first and second pistons 66 and 80. In this mode, the second piston 80 is solely responsible for shifting the valve element 14 upwardly. The surface 72 of the first piston 66 is larger than that of the surface 84 of the second piston 80 and will enable the second fluid to force the first piston upward into contact with the valve housing 12 without affecting the valve element 14, at a relatively lower level of pressure than will enable the second piston 80 to travel upwards and contact the valve element 14 in opposition to the spring 38. Therefore, the effective surface area exposed to the sensing port 63 is reduced to that of the second piston second surface 84. If the spring 38 is unaltered, a much higher sensed fluid pressure through port 63 is required to overcome the force exerted by the spring to shift the valve element 15 from its first to its second position.

The piston mechanism of the present invention is thus adapted to provide two different ranges of fluid pressure sufficient to shift valve element 14 from its lower position to its upper position in opposition to a single spring 38 having a specific compression range determined by the location of the adjusting screw 48 upon the spring housing 40. It is therefore adapted to be fully functional over a wide range of sensing fluid pressure when used with a single spring, the varying ranges of fluid pressure sufficient to actuate the valve element 14 being dictated by the presence or absence of the spacer 94 between the first and second piston means 64 and 80 within the piston chamber 62 and hence, the particular effective fluid pressure area thereof exposed to the sensing port 63. From the foregoing it will seen that this invention is one well adapted to obtain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof it is to be understood that all matters herein set forth or shown in the accompanying drawings is to be interpreted as illustrative and not in a limiting sense.

The invention having been described, what is claimed is:

1. A pilot valve comprising:
   (a) a valve body, having:
       (1) an elongated bore therein,
       (2) a first fluid inlet port communicating with said said bore,
       (3) a second fluid inlet port communicating with said bore,
       (4) an outlet port communicating with said bore, and
       (5) a sensing port communicating with said bore;
   (b) a valve element slidably engaged within said bore for regulating the flow of fluid through said pilot valve, said valve element being shiftable between
       (1) a first position permitting communication between said first inlet port and said outlet port and precluding communication between said second inlet port and said outlet port; and
       (2) a second position permitting communication between said second inlet port and said outlet port and precluding communication between said first inlet port and said outlet port;
   (c) means for urging said valve element into its first position, the improvement comprising:
   a piston means slidable within a piston chamber for shifting said valve element from its first position to its second position, said piston means being exposed to said sensing port so that sufficient fluid pressure applied to said sensing port will cause said piston means to engage said valve element to shift said element from its first position to its second position, against the action of said urging means, said piston means comprising:
       (a) a first piston slidable within said piston chamber, said first piston having a first and second sections, said first section being of larger diameter and concentrically aligned with said second section, and having a concentric bore therethrough, said concentric bore being of first and second sections, said sections being aligned with the first and second sections of said first piston, said first section of said concentric bore being of larger diameter than the second section of the concentric bore, and
       (b) a second piston slidably mounted within said first piston, said second piston having first and second sections, said first section of said second piston being of larger diameter than said second section and slidably in contact with the first section of said concentric bore of said first piston, the length said first section of said second piston being less than that of said first section of said concentric bore, and said second section of said second piston being slidably in contact with the second section of said concentric bore;
       (c) seal means annularly mounted around said second section of said second piston and having an outer diameter substantially the same as that of the second section of said first piston so as to hermetically seal said sensing port from the elongated bore, said seal means being capable of sliding movement within said piston chamber in response to the fluctuating fluid pressure within said sensing port and in response to movement by said first piston.
       (d) spacer means for positioning said second piston within said first piston, said spacer means being placed at the juncture of the first and second sections of said second piston, said spacer being of substantially the same thickness as the difference in lengths between the first section of said second piston and the first section of the concentric bore of said first piston, wherein said piston means defines first and second operating modes,
           (a) said first operating mode wherein said spacer is positioned between said first and second piston means so as to mount said second piston flush with the ends of said first piston whereby the effective surface area of the piston means is equal to that area defined by the diameter of said seal means,
           (b) said second operating mode wherein said spacer is removed from between said first and second pistons whereby the larger surface area of said first piston and said seal means will enable the fluctuating fluid pressure within said sensing port will induce said first piston and seal means into contact with said valve body at a relatively low level of pressure with respect to that level of pressure required to move said second piston upward into contact with said valve element in opposition to said means for urging said valve element into its first position and wherein the effective surface area of said piston means is reduced to that of the second end of said second piston,
   the presence or absence of said spacer means determines the range within in which said piston means is enabled to shift said valve element from said first position to said second position.

2. A device for use with a valve having a body and operable valve element therein, said device for actuating said valve element, comprising:
   (a) a housing having a piston chamber therein and a sensing port communicating with said chamber, and
   (b) piston means slidably engaged within said chamber and exposed to said sensing port for actuating said valve element in response to fluid pressure applied to said sensing port, said piston means comprising:
       (a) a first piston slidable within said piston chamber, said first piston having a first and second sections, said first section being of larger diameter and concentrically aligned with said second section, and having a concentric bore therethrough, said concentric bore being of two sections, said first section of said concentric bore being of larger diameter than the second section of the concentric bore, and
       (b) a second piston slidably mounted within said first piston concentric bore, said second piston having first and second sections, said first section of said second piston being of larger diameter than said second section and slidably in contact with the first section of said first piston concentric bore the length of said first section of said second piston being less than that of said first section of said concentric bore, and said second section of said second piston being slidably in contact with the second section of said first piston concentric bore;

(c) seal means annularly mounted around said second section of said second piston and having an outer diameter substantially the same as that of the second section of said first piston so as to hermetically seal said sensing port from the elongated bore, said seal means being capable of sliding movement within said piston chamber in response to the fluctuating fluid pressure within said sensing port and in response to movement by said first piston.

(d) spacer means for spacing said second piston within said first piston, said spacer means being placed at the juncture of the first and second sections of said second piston, said spacer being of substantially the same in thickness as the difference in lengths between the first section of said second piston and the first section of the concentric bore of said first piston, wherein said piston means defines first and second operating modes, (a) said first operating mode wherein said spacer is positioned between said first and second piston means so as to mount said second piston flush with the first end of said first piston whereby the effective surface area of the piston means is equal to that area defined by the diameter of said seal means, the second section of the concentric bore plus the area of the second end of said second piston, (b) said second operating mode wherein said spacer is removed from between said first and second pistons whereby the larger surface area of said first piston and said seal means will enable the fluctuating fluid pressure within said sensing port will induce said first piston and seal means into contact with said valve body at a relatively low level of pressure with respect to that level of pressure required to move said second piston upward into contact with said valve element in opposition to said means for urging said valve element into its first position and wherein the effective surface area of said piston means is reduced to that of the second end of said second piston, wherein when said piston means is in said first operating mode the force exerted by said piston means will be less than the force exerted when in said second operating mode and whereby presence or absence of said spacer means determines the pressure range within which said piston means is enabled to shift said valve element from said first position to said second position.

* * * * *